Patented Nov. 9, 1948

2,453,675

UNITED STATES PATENT OFFICE 2,453,675

ALKAMINE ALKYL ESTERS OF PYRROLE-3,4-DICARBOXYLIC ACIDS

Jackson P. Sickels, Plainfield, N. J., and Donald E. Sargent, Easton, Pa., assignors to American Cyanamid Company, New York, N. Y., a corporation of Maine No Drawing. Application November 13, 1946, Serial No. 709,404

7 Claims. (Cl. 260—313)

This invention relates to mixed alkyl, alkamine esters of pyrrole-3,4-dicarboxylic acids.

3,4-pyrrole-dicarboxylic acids are known, but mixed alkylalkamine esters have never been produced and cannot be produced by direct esterification. It has been found according to the present invention that it is possible to produce these products by indirect methods, such as partial alcoholysis and by way of the anhydride.

The products of the present invention may be represented by the following formula:

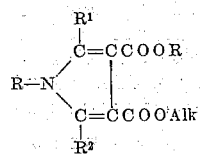

in which R is alkyl, $R^1$ and $R^2$ are alkyl and Alk is the residue of a dialkylamino alcohol. The two preferred syntheses both involve the production of an intermediate 1-alkylpyrrole-3,4-dicarboxylic acid diester. This intermediate may be prepared readily by condensing a dialkyldiacylsuccinate with ammonia or an aliphatic amine. The simplest dialkyldiacylsuccinate is the diethyldiacetosuccinate which results in producing a 2,5-dimethylpyrrole product and this class constitutes the preferred modification of the present invention. Other substituents in the 2,5 position may be prepared by using other diacylsuccinates such as dipropionosuccinates.

The products of the present invention are useful as activators for rubber accelerators and some of them show local anaesthetic power. When used as a local anaesthetic water solubility is necessary and the products are usually used in the form of the salts of the free ester with strong acids, the hydrochloric being preferred.

The invention will be described in greater detail in conjunction with the following specific examples in which the parts are by weight and temperatures are uncorrected unless otherwise specified.

EXAMPLE 1

*β-diethylaminoethyl-1,2,5-trimethyl-3-carbethoxypyrrole-4-carboxylate hydrochloride*

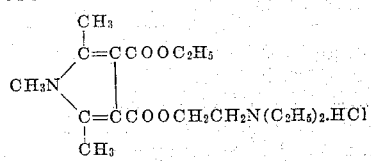

2 parts of sodium are dissolved in 398 parts β-diethylaminoethanol and 143 parts of diethyl-1,2,5-trimethylpyrrole-3,4-dicarboxylate added. The ester may be prepared by condensing diethyldiacetosuccinate with methylamine. The reaction mixture is heated for a long period at 130° C. until reaction is substantially complete and the β-diethylaminoethanol is then removed by distillation under reduced pressure. The residue is dissolved in ether, washed with water, dried, and the hydrochloride precipitated by adding hydrogen chloride in ether. On cooling it solidifies and may be transformed into the free base by dissolving in water and treatment with sodium carbonate. The free base is an oil which is light yellow in color and has a refractive index of about 1.5 and cannot be distilled under atmospheric pressure without decomposition. The hydrochloride is a light grey powder having a melting point of 139–141° C.

EXAMPLE 2

*β-diethylaminoethyl-1,2,5-trimethyl-3-carbethoxypyrrole-4-carboxylate hydrochloride*

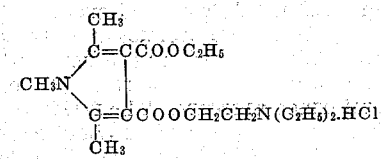

165 parts of 1,2,5-trimethylpyrrole-3,4-dicarboxylic acid anhydride (prepared by treating the free acid with acetic anhydride) are suspended in 825 parts of dry pyridine. 125 parts of absolute ethyl alcohol are then added, and the reaction mixture heated with agitation for a number of hours until reaction is complete, care being taken to keep conditions anhydrous.

After completion of the reaction the pyridine is removed by distillation under reduced pressure, the final portions being removed azeotropically with a small amount of 95% ethyl alcohol. The product is the monoethyl ester of 1,2,5-trimethylpyrroledicarboxylic acid and may be purified by recrystallization from alcohol.

To 69 parts of the 1,2,5-trimethyl-3-carbethoxypyrrole-4-carboxylic acid, 150 parts of thionyl chloride are rapidly added while chilling by means of an ice bath. The acid dissolves, giving a red solution and the mixture is then heated at 50–60° C. for a number of hours. After the reaction is complete thionyl chloride is distilled off under reduced pressure, the last traces being removed azeotropically with dry benzene as the added liquid.

The solid residue is dissolved in dry benzene and 95 parts of β-diethylaminoethanol added. The reaction mixture heats up and is maintained at 50–60° C. for several hours.

Water and excess potassium hydroxide are added and the free base and unreacted β-diethylaminoethanol extracted with ether. The solution is dried, the ether removed under reduced pressure, and finally the last of the ether and the unreacted β-diethylaminoethanol removed by distillation at about 11 mm. Residual oil is obtained which boils at 201–205° C. at 2 mm. It is yellow in color and has a refractive index of about 1.5.

The free base is dissolved in ether and a solution of hydrogen chloride in ether added. The hydrochloride separates as an oily material which soon solidifies and is filtered and recrystallized from butyl alcohol, forming a greyish-white powder melting at 139.5–140.5° C.

EXAMPLE 3

γ-*diethylaminopropyl 1,2,5-trimethyl-3-carbethoxypyrrole-4-carboxylate hydrochchloride*

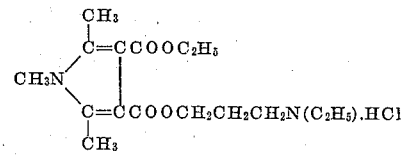

78 parts of 1,2,5-trimethyl-3-carbethoxypyrrole-4-carboxylic acid, prepared as described in the foregoing example, are chilled and 150 parts of thionyl chloride added. The acid dissolves quickly to form a red solution, and after all of the thionyl chloride is added the temperature of the reaction mixture is raised to 50° C. and maintained there for several hours. The thionyl chloride is then removed by distillation under reduced pressure, the last traces being removed by azeotropic distillation, using dry benzene.

The residue is dissolved in dry benzene, cooled and 100 parts of γ-diethylaminopropanol added. The reaction mixture is heated at 50° C. for several hours and then water and excess potassium hydroxide added. The product is extracted with ether, the extract dried and ether and excess γ-diethylaminopropanol removed by distilling under diminished pressure. The residual oil boils at 206–210° C. at a pressure of about 2 mm. and may be transformed into the hydrochloride as described in the foregoing example. The hydrochloride, after recrystallization from butyl alcohol, is a grey-white microcrystalline powder, melting at 128–129.5° C.

EXAMPLE 4

β-*diethylaminoethyl-1-n-myristyl-2,5-dimethyl-4-carbethoxy-pyrrole-3-carboxylate*

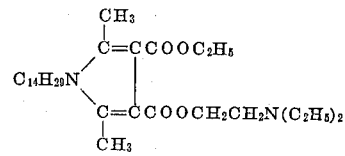

134 parts of diethyl-1-n-myristyl-2,5-dimethyl-pyrrole-3,4-dicarboxylate (prepared by condensation of diethyldiacetosuccinate with n-myristylamine in glacial acetic acid solution) is mixed with 360 parts of β-diethylaminoethanol in which 1.4 parts of sodium have been dissolved. The mixture is heated and the displaced ethyl alcohol distills over at 75–80° C. The temperature of the distillate then gradually rises to 160° C., whereupon the pressure is reduced to 10 mm. and the excess β-diethylaminoethanol distilled off.

The residue is then dissolved in ether, washed with water, and the ether solution dried. After removal of the ether the residual oil is fractionally distilled and boils at about 275–285° C. under 3 mm. pressure.

The ester produced is soluble in most organic solvents and in dilute mineral acids, but is insoluble in water. It has a refractive index of 1.489.

The preparation of this compound is anomalous as the amount of β-diethylaminoethanol is sufficient theoretically to give the diester and under these reaction conditions diester would be formed in the case of most other 1-alkyl-2,5-dimethyl-pyrrole-3,4-carboxylic acid ethyl esters. The reason for the anomalous behaviour has not been determined.

EXAMPLE 5

β-*dimethylaminoethyl 1,2,5-trimethyl-3-carbethoxypyrrole-4-carboxylate hydrochloride*

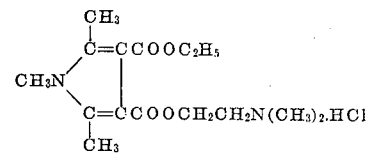

The procedure of Example 1 is followed, using in place of the 398 parts of β-diethylaminoethanol, the stoichiometrically equivalent amount of β-dimethylaminoethanol. The reaction proceeds in the same manner except that the excess dialkylamino alcohol is removed at a slightly lower temperature. The free base obtained is a light yellow oil closely resembling that of Example 1 and the hydrochloride is a solid having the same chemical properties as the product of Example 1.

EXAMPLE 6

γ-*dipropylaminopropyl 1,2,5-trimethyl-3-carbethoxypyrrole-4-carboxylate hydrochloride*

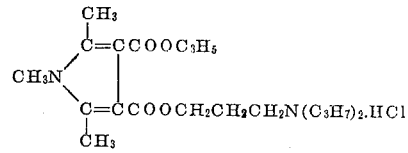

The procedure of Example 3 is followed but instead of using 100 parts of γ-diethylaminopropanol the stoichiometrically equivalent amount of γ-dipropylaminopropyl is used. The products obtained closely resemble the products of Example 3.

EXAMPLE 7

β-*diethylaminoethyl 1,2,5,-trimethyl-3-carbomethoxypyrrole-4-carboxylate hydrochloride*

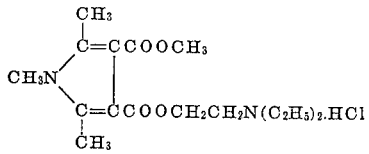

The procedure of Example 2 is followed but the ethyl alcohol is replaced by a stoichiometrically equivalent amount of methyl alcohol. The reaction proceeds in the same manner and the products obtained closely resemble those of Example 2.

In the foregoing examples where an alcoholysis is employed the reaction has proceeded in the presence of sodium alcoholate as a catalyst. It is not material whether the catalyst is added in a preformed state, formed by dissolving the sodium in the amino alcohol, or by adding the sodium to the reaction mixture. Similar results are obtainable with potassium alcoholate but the additional cost is not warranted. It is an advantage of the present invention that the amount of the alcoholate is not critical. However, it should be present in catalytic amounts, that is to say in amounts far below stoichiometrical equivalents. In general sufficient catalyst should be used to produce a rapid reaction, but it will normally be found that the amount does not have to materially exceed $\frac{1}{20}$ stoichiometrical equivalent, based on the amino alcohol. The term "catalytic amounts" used in the claims is intended to be used in this sense only.

In the copending applications of D. E. Sargent, Ser. Nos. 496,959, 496,960 and 496,61, all filed July 31, 1943, now abandoned, there are described various esters of pyrrole-3,4-dicarboxylic acids. In the first case the nitrogen atom of the pyrrole ring is substituted by the cyclohexyl radical. In the second case the nitrogen atom contains a dialkylaminoalkyl substituent, while in the third case the nitrogen atom may be unsubstituted or substituted by alkyl or aryl radicals and the 2 and 5 carbons are substituted by aryl groups.

In the copending applications of J. P. Sickels, Ser. Nos. 496,963 and 496,964, both filed July 31, 1943, now abandoned, there are claimed dialkylaminoalkyl esters of 1-alkyl pyrrole-3,4-dicarboxylic acids and 1-aralkyl-pyrrole-3,4-dicarboxylic acids. In the present application these compounds are not claimed, this application being limited to esters of pyrrole-3,4-dicarboxylic acids, in which one of the carboxyl groups is esterified with a monohydric paraffin alcohol and the other carboxyl is esterfied with a dialkylaminoalkanol. No symmetrical dialkylaminoalkyl esters of pyrrole-3,4-dicarboxylic acids are claimed in the present application.

This application is in part a continuation of our copending application, Serial No. 496,957, filed July 31, 1943, now abandoned.

We claim:

1. A compound selected from the group consisting of esters of 1,2,5-trialkyl-3-carbalkoxypyrrole-4-carboxylic acid with dialkylamino alkanols and the addition salts of the esters with strong acids.

2. A compound selected from the group consisting of esters of 1-alkyl-2,5-dimethyl-3-carbalkoxypyrrole-4-carboxylic acid with dialkylamino alkanols and the addition salts of the esters with strong acids.

3. A compound selected from the group consisting of esters of 1-alkyl-2,5-dimethyl-3-carbalkoxypyrrole-4-carboxylic acid with β-dimethyl-aminoethanol and the addition salts of the esters with strong acids.

4. A member of the group consisting of β-diethylaminoethyl-1,2,5-trimethyl-3-carbethoxy-pyrrole-4-carboxylate having the formula:

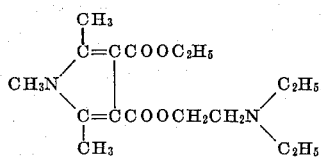

and its addition salts with strong acids.

5. A member of the group consisting of β-diethylaminoethyl-1-myristyl-2,5-dimethyl-3-carbethoxypyrrole-4-carboxylate having the formula:

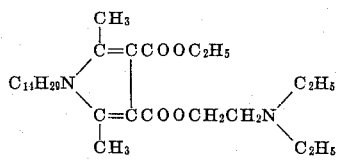

and its addition salts with strong acids.

6. A member of the group consisting of γ-diethylaminopropyl-1-alkyl-2,5-dimethyl-3-carbalkoxypyrrole-4-carboxylate having the formula:

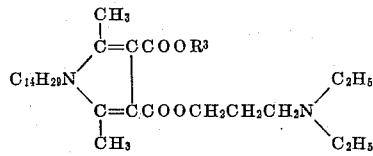

$R^3$ is alkyl and its addition salts with strong acids.

7. A method of preparing a mixed alkyl dialkylaminoalkyl ester of a pyrolle-3,4-dicarboxylic acid which comprises reacting a 1-alkyl-3-carbethoxy-pyrolle-4-carboxylic acid with thionyl chloride and esterifying the acid chloride thus produced with a dialkylamino alkanol.

JACKSON P. SICKELS.
DONALD E. SARGENT.

No references cited.